United States Patent [19]

Crimes

[11] 4,058,394
[45] Nov. 15, 1977

[54] PYROMETALLURGICAL SYSTEM FOR SOLID-LIQUID CONTACTING

[75] Inventor: Peter B. Crimes, Sudbury, Mass.

[73] Assignee: Kennecott Copper Corporation, New York, N.Y.

[21] Appl. No.: 660,021

[22] Filed: Feb. 23, 1976

[51] Int. Cl.² .............................................. C21C 7/00
[52] U.S. Cl. .......................................... 75/61; 75/30; 266/166
[58] Field of Search .............................. 75/61; 266/14

[56] References Cited
U.S. PATENT DOCUMENTS 3,824,095  7/1974  Ando ........................................ 75/61

Primary Examiner—Peter D. Rosenberg
Attorney, Agent, or Firm—Anthony M. Lorusso; John L. Sniado

[57] ABSTRACT

Disclosed is a pyrometallurgical reactor for entraining a low density particulate solid (e.g., coal) in a high density liquid (e.g., slag) in order to promote and accelerate reactions dependent upon contact between the solid and the liquid. The present disclosure develops interrelationship between the dimensions and rotation rate of a mechanical stirrer and the dimensions of the reactor vessel in order to achieve, simultaneously, good entrainment of the particulate solid which is delivered to the surface of the liquid, minimal entrainment of gasses along with the particulate solid, and minimal erosion of the vessel walls.

14 Claims, 3 Drawing Figures

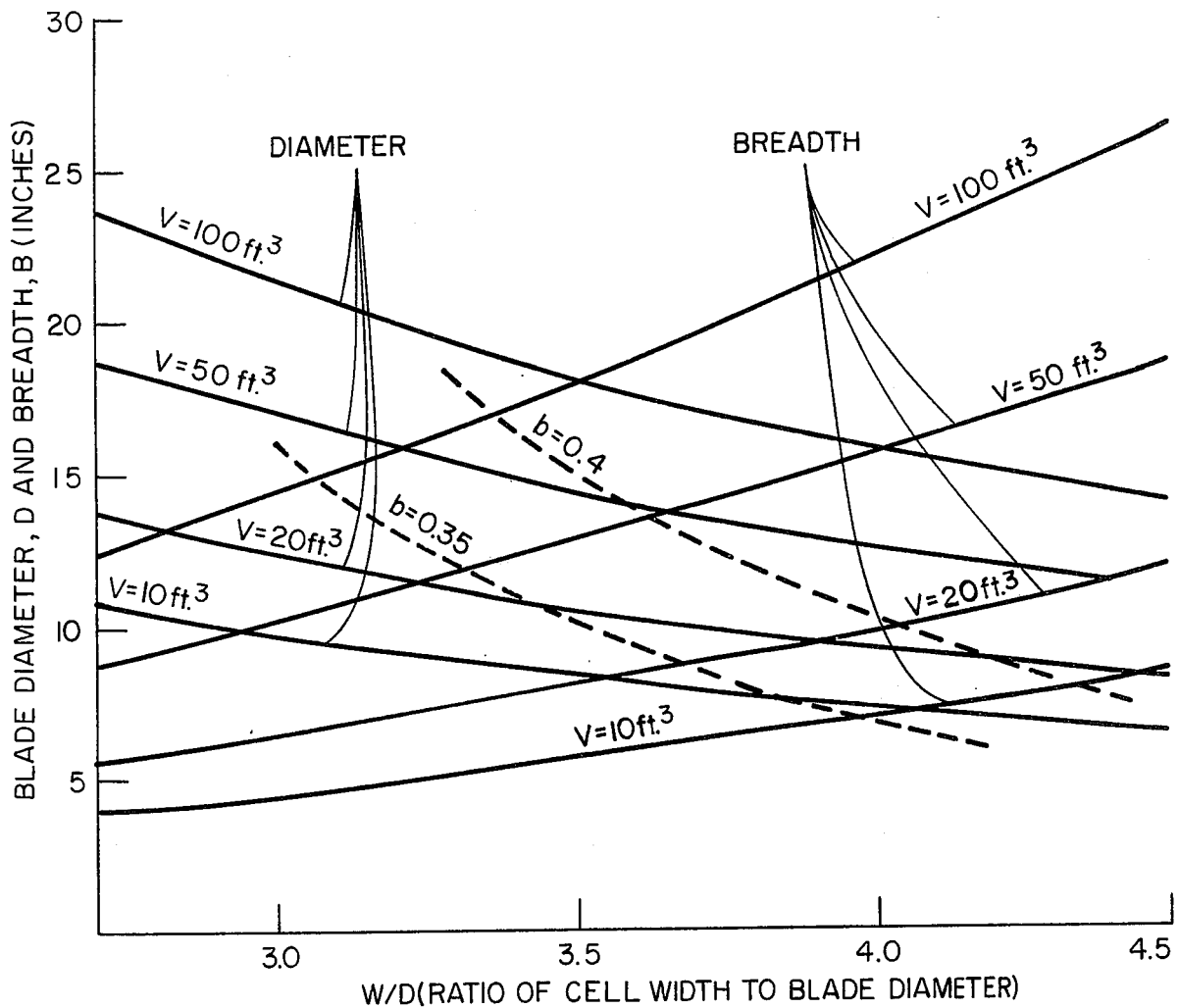

PYROMETALLURGICAL SYSTEM FOR SOLID-LIQUID CONTACTING

BACKGROUND OF THE INVENTION

In general, the present invention is directed to pyrometallurgical systems wherein it is desired to entrain particulate matter into a molten slag. In particular, the invention relates to an improved design for a mechanical stirrer of the type described in U.S. Pat. No. 3,861,660, issued Jan. 21, 1975, and owned by the Assignee of the present invention.

According to the present invention, it has been realized that certain groups of stirrer parameters are important in optimizing the desired results in pyrometallurgical systems in which (a) particulate solid-liquid contacting is required and (b) liquid-liquid contacting is required. The present invention is directed to the former improvements and my contemporaneously filed U.S. patent application entitled "Pyrometallurgical System for Liquid-Liquid Contacting" is directed to the latter improvements.

The economic competitiveness of pyrometallurgical slag cleaning, as compared to milling-flotation, depends upon rapid reaction rates which, in turn, depend upon maximizing the entrainment of the particulate reductant (e.g., coal) in the liquid slag. The rapid entrainment of such a reductant into the liquid slag is rendered difficult by the concommitent requirement of not entraining gas along with the particulate solid. Furthermore, the entrainment is also difficult since it involves the entraining of a low density particulate solid floating on the surface of a high density liquid slag, thereby requiring that the inherent high buoyancy of the particulate matter be overcome.

It is thus a principle object of the present invention to provide, for use in a pyrometallurgical system, an improved stirrer or an array of stirrers which will rapidly and efficiently entrain a low density particulate solid into a high density liquid.

It is a further object to provide such a stirrer or an array of stirrers which will entrain the particulate solid without entraining substantial quantities of gas as well and without causing substantial damage or wear to the walls of the vessel which contains the liquid.

SUMMARY OF THE INVENTION

Briefly, the invention features a process for entraining particulate matter in a high density liquid having a volume V defined by either a square of side W or a circle of diameter 1.13W and by a depth H, comprising the steps of: providing a rotatable stirrer in the liquid having a submerged blade assembly with a diameter D, which is about 0.1W to 0.4W with a breadth, B, which is about 0.0H to 0.7H; supplying particulate matter to the surface of the liquid; and rotating the stirrer at a rate of N RPM, where N is such that the particulate matter is drawn down through the vortex produced by the rotating stirrer to the rotating submerged blade assembly, pumped radially outward therefrom by the rotating blade assembly such that the particulate matter is circulated through the liquid whereby a large area of contact between the liquid and particulate matter is obtained. In a preferred mode of operation N RPM is from about $100/D^{\frac{1}{2}}$ to about $450D^{\frac{1}{2}}$ and preferably about $450D^{\frac{1}{2}}$ when D is given in inches.

Where a vessel having a circular cross section is used the volume V is defined by a circle of diameter 1.13W and depth H. Circular cross section vessels preferably have wall baffles, as is commonly practiced. In all other respects, the computations and derivations concerning blade geometry, rotational speed, and placement as discussed herein are to be considered as equivalent to those for vessels of generally square cross sections where V is defined by a square of side W and and depth H. For the sake of brevity only vessels of square cross section configuration will be described herein in detail. The principal criteria of stirrer pumping rate per unit volume and vortex strength are equivalent for square or round cross section vessels. The ratios of blade dimensions to vessel dimensions are substantially equivalent, differing by only about 13%.

Preferably, the high density liquid is a slag in a pyrometallurgical system and the particulate matter is supplied to the surface of the liquid in a quantity sufficient to at least fully cover that surface of said liquid, thereby enabling the vortex produced by the rotating stirrer to be fully fed by the particulate matter.

In another aspect, the invention features improvements in a stirrer for entraining floating particulate matter downwardly into a high density liquid in a vessel of side W, height H, and volume $V=HW^2$. Means are provided for rotating a stirrer at N RPM, the stirrer including a blade assembly immersed in the liquid. The blade assembly diameter D and breadth B, and the value of N are given as:

$$D = \frac{V^{\frac{1}{3}}}{dc^{\frac{1}{3}}},$$

$$B = \frac{pc^{\frac{1}{3}}d^{3/2}V^{\frac{1}{3}}}{mf^{\frac{1}{3}}}, \text{ and}$$

$$N = \frac{f^{\frac{1}{3}}d^{\frac{1}{3}}c^{1/6}}{V^{1/6}},$$

where, $d=W/D$, $C=H/W$, $f$ is a parameter specifying the desired vortex strength and is approximately 200,000 when all dimensions are in inches, $p$ is a parameter specifying the pumping rate and is approximately 4 when all dimensions are in inches and $m$ is an efficiency coefficient related to the number of blades and is 1 for two bladed stirrers, approximately 1.3 for three bladed stirrers and approximately 1.6 for four bladed stirrers. Preferably, the stirrer further includes a baffle plate disposed about the stirrer shaft generally perpendicular to the shaft axis adjacent the bottom edge of the blade assembly; the value of $d$ is in the range of about 2.5 to 10.0; and the ratio of blade assembly breadth to the depth of the liquid is no more than about 0.7.

BRIEF DESCRIPTION OF THE DRAWINGS

For a fuller understanding of the nature and objects of the invention, reference should be had to the following detailed description taken in connection with the accompanying drawings, in which:

FIG. 3 is a graph depicting the interrelationships, according to the present invention, of various dimensions of the pyrometallurgical reactor of FIG. 1.

DETAILED DESCRIPTION OF PREFERRED EMBODIMENTS

The present invention concerns a reactor which is designed to promote reactions in pyrometallurgical systems in which a particulate solid matter (e.g., coal) is to be mixed with a high density liquid (e.g., molten slag). The general type of pyrometallurgical system to which the present invention relates is described in detail in U.S. Pat. No. 3,861,660, entitled "Pyrometallurgical System With Fluid Cooled Stirrer", issued Jan. 21, 1975 to the Assignee of the present invention. While the internal construction of the stirrer described below is preferrably that described in U.S. Pat. No. 3,861,660, according to the present invention certain interrelationships between the stirrer dimensions, the reactor vessel dimensions, and the rate of rotation of the stirrer have been identified which solve the difficult problem of entraining a low density particulate solid (e.g., coal) into a high density liquid (e.g., molten slag) without undesirable side effects, all is further described below.

As indicated above, the present invention concerns a reactor which is designed to promote and facilitate very fast reaction rates in pyrometallurgical systems. While the invention had broad application to promoting reactions between a liquid and a solid, most commonly the liquid will be a molten slag. As used herein, the term "slag" is intended to encompass a wide variety of materials generally referred to as "slag" in the art; principally silicate-based materials associated with the production of metals.

Figure 1:
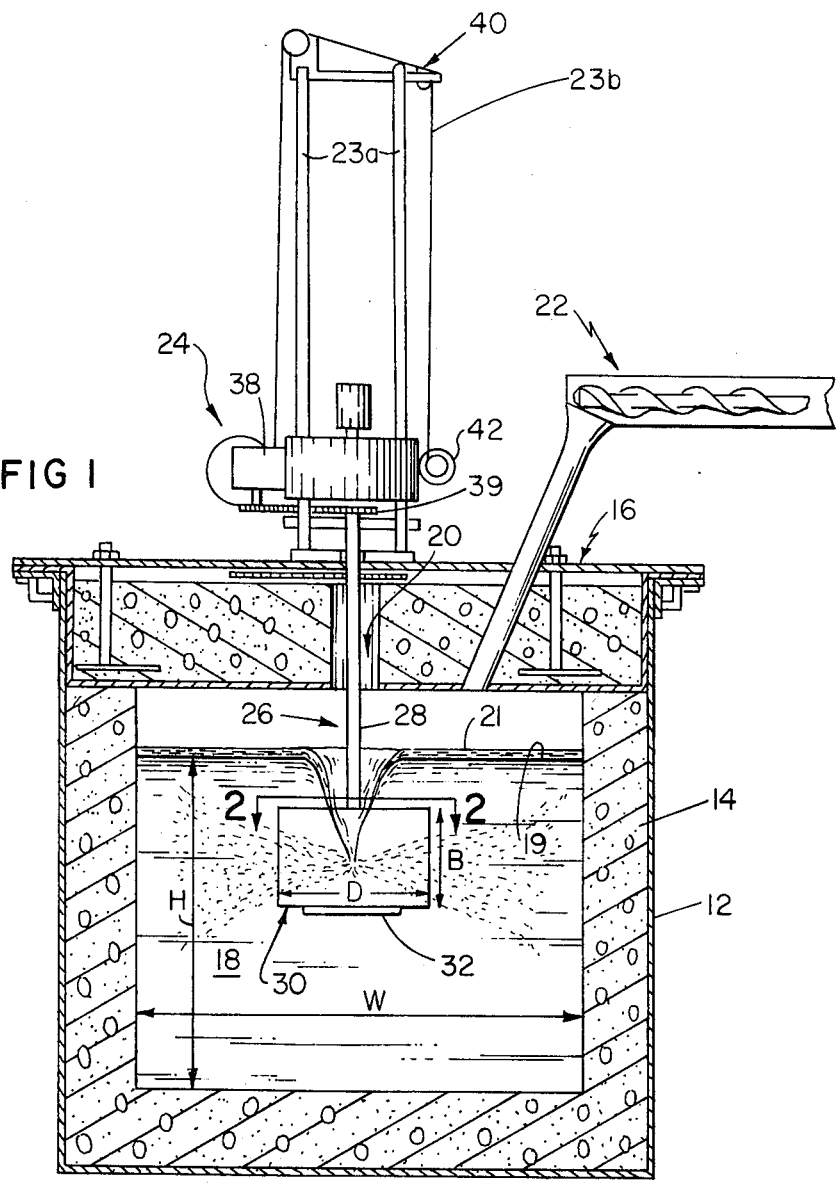
FIG. 1 is a somewhat idealized sectional view of a pyrometallurgical reactor incorporating features of the present invention.

FIG. 1 illustrates a typical reactor in the form of a slag melting furnace comprising vessel or crucible 12 lined with a refractory 14, and a cover 16, for holding a volume of molten slag 18. The depth of liquid in the vessel is indicated at H and the internal dimensions of the vessel are substantially a square of side W or a circle of diameter 1.13W. Since the slag can be heated in any conventional manner, for simplicity no heating measure is shown. A mechanical stirrer 26 projects downwardly into the molten slag 18 and comprises a blade assembly 30 secured to a rotatable shaft 28 which projects downwardly through cover 16 into the vessel. A variable speed drive 24 of conventional design, is provided for rotating the stirrer 26. As is discussed in greater detail below, a particulate solid 21 (e.g., coal) is supplied to the surface 19 of the molten slag 18 by any conventional arrangement, such as the funnel and conveyor system 22 of FIG. 1.

Figure 2:
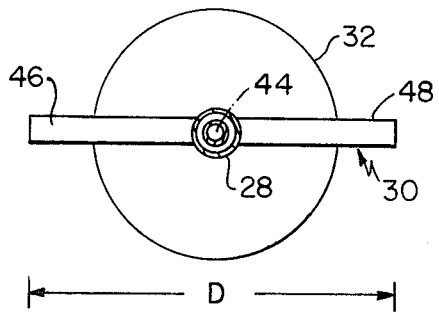
FIG. 2 is a view taken at 2—2 of FIG. 1.

Referring to both FIG. 1 and 2, the blade assembly 30 is preferably formed from copper because of its high thermal conductivity, as explained in the above-mentioned U.S. Pat. No. 3,861,660. As best seen in FIG. 2, in illustrated embodiment the blade assembly comprises the unitary rectangular block symmetrically disposed about the shaft axis 44 providing diametrically opposed blade portions 46 and 48. The blade assembly has a breadth (or height) B. A circular baffle plate 32 is secured to the shaft 28 beneath the blade assembly 30. The effect of the rotation of the blade assembly is to create a vortex in the center of the vessel 10 into which the particulate matter 21 is drawn. A radial pumping of the particulate matter throughout the volume of molten slag 18 occurs when the particulate matter reaches the depth of the blade assembly 30.

The baffle 32 inhibits axial flow from below, thereby maximizing both the flow from above and the mixing of the particulate matter with the molten slag. The inhibition of axial flow from below also assists in keeping "settled-out" denser liquid phases, as is desired in various pyrometallurgical processes.

The internal construction of the stirrer 26, as well as the means by which it is supported and driven, are preferably as described in the previously mentioned U.S. Pat. No. 3,861,660. Internal conduits for fluid cooling are provided in the shaft 28 and extend into the blade assembly 30. A cooling fluid delivery assembly is provided at the upper end of the shaft 28. The stirrer drive 24 includes a motor 38 which drives a belt 39 which engages a sprocket secured to the stirrer shaft 28. The drive assembly 24 is mounted on the guides 23a which are secured to frame 23b and a pulley system 40 and motor 42 are provided for raising and lowering the entire stirrer and stirrer drive assembly, thereby permitting adjustment of the depth of the blade assembly 30 in the slag.

The design criteria and interrelation of parameters for a suitable stirrer, further discussed below, have been found necessary to prevent the entrainment of gases along with the particulate matter and to prevent excessive erosion of the refractory walls 14 by excessive, or turbulent, flow of slag adjacent those walls. In accordance with the present invention it has been found that the requirement for dispersing a low density solid in a high density liquid without entraining gas depend primarily upon two parameters, a bulk pumping rate of the stirrer per unit volume of liquid and the strength of the vortex generated.

The volume of liquid mixed by stirrer 26 of FIG. 1 is $V = (H)(W^2) = cW^3$; where $H = cW$ and $c$, the cell ratio, typically is less than 1.0. As explained in a patent application entitled "Mechanically Stirred Furnace for Pyrometallurgical Operations and Processes" filed concurrently herewith and owned by the Assignee of the present invention, under various circumstances it is desirable to divide the volume of the typically large commercial pyrometallurgical reactors into a plurality of "unit cells" each mixed by a separate stirrer. For such an arrangement, the dimensions of each such "unit cell" would be substituted for the internal dimensions of the vessel in the analysis given below.

To optimize the dispersion, any impediment to the entrainment of particulate matter in the vortex created by the stirrer must be avoided. In practical terms, this means providing a shaft assembly with no protrusions or hubs immediately above the blade assembly and maintaining a solid blade across the whole diameter (e.g., no gaps at the hub).

Since the correct stirring conditions provide an adequate radial inflow at the slag surface, it is not necessary to feed the particulate matter directly into the vortex. In fact, since the available surface area for reaction depends only on the number and size of the submerged particles, it is highly desirable when adding coal, for example, to the surface of the slag bath to do so in a steady stream so that each particle can carbonize separately, thereby avoiding the coking of large masses as may occur if coal were dumped directly into the vortex.

In order to maximize the dispersion in the slag, however, it is necessary to provide sufficient material to keep the vortex fully fed by the radial inflow. This means at least a complete surface cover when the slag is unstirred, and be preferably 50% more. Major advantages of keeping the vortex full of solid material are that the risk of air entrainment is minimized and excessive surface turbulence near the walls is avoided.

For the simple two bladed agitator illustrated in FIGS. 1 and 2, the agitator dimensions are related to the cell dimension W by the following ratios:

$$W/D = d \text{ and } B/H = B/cW = b$$

The scaling parameters for the vortex strength and the pumping rate per unit volume are given by the following relationships:

$$N^2D = f; \; NBD^2/V = p$$

where $N$ = RPM. For dimensions in inches, it has been discovered that good results (i.e., good entrainment of particulate solid, low entrainment of gas, and low erosion of vessel walls) are obtained when these quantities are roughly $f = 200{,}000$ and $p = 4$. Thus, for maximum particulate entrainment without undesirable side effects, $N = 450/D^{1/2}$. With dense liquids and light particulate solids, entrainment of the solids commences at a rotation rate of about $N = 100/D^{1/2}$.

The dimensions and rotational speed of the agitator can then be expressed in terms of $c, b, d, p, f$, and the cell volume as follows:

$$D = \frac{V^{\frac{1}{3}}}{dc^{\frac{1}{3}}} \quad B = \frac{pc^{\frac{1}{3}}d^{3/2}V^{\frac{1}{3}}}{f^{\frac{1}{2}}} \quad N = \frac{f^{\frac{1}{2}}d^{\frac{1}{2}}c^{1/6}}{V^{1/6}}$$

These relationships can be rearranged to show the interdependence of $b, d,$ and $V$.

$$b = \frac{p}{f^{\frac{1}{2}}c^{1/6}} \cdot c^{\frac{1}{3}}V^{1/6} = kd^{\frac{1}{3}}V^{1/6}, \text{ (where } k = \frac{p}{f^{\frac{1}{2}}c^{\frac{1}{3}}}\text{).}$$

It has also been discovered that quite apart from the above relationships, there are approximate ranges on the useful values of $d$ and $b$. In particular, $d$ should be limited to between about 2.5 and 10.0 in order to get an adequate pumping rate without turbulence at the vessel walls which would cause unacceptably rapid erosion of the refractory lining. Additionally, $b$ should be limited to no more than about 0.7, and preferably 0.4, or else undesirable characteristics (e.g., vortex instability and incomplete utilization of the whole blade for pumping) begin to develop. (If using the above values for $p, f, b, c,$ and $d$ leads to a calculated value for V which is less than the volume to be treated, then in accordance with the above-mentioned concurrently filed United States patent application entitled "Mechanically Stirred Furnace for Pyrometallurgical Operations and Processes", the volume is divided into a suitable number of "unit cells", each having a separate agitator, which are arranged in any convenient pattern, e.g. $1 \times 2, 1 \times 2, 2 \times 2, 2 \times 3$, etc.)

If the cell ratio, $c$, is taken as 2/3 and the values of $f$ and $p$ are 204,000 and 3.7, respectively, (N in RPM, dimensions in inches), then the above expressions, for V in cu. ft., reduce to $$D = \frac{13}{74} \frac{V^{\frac{1}{3}}}{d}$$

$$B = 0.278 \; d^{3/2}V^{\frac{1}{3}}$$

$$N = 122 \frac{d^{\frac{1}{2}}}{V^{1/6}}$$

From these simplified expressions it is easy to calculate the blade dimensions as a function of the cell volume for any desired ratio of the cell width to blade diameter.

The blade dimensions have been plotted as a function of $d$ for cell volumes between 10 and 100 cu. ft. in FIG. 3. In addition are shown two curves connecting points of equal values of $b$ (i.e., ratio of blade breadth to liquid depth) of the family of curves for blade breadth. The important point to be noted is that as the volume is increased, the ratio d decreases for a constant value of $b$. Put another way, it is impossible to keep both $b$ and $d$ at optimum values as the cell volume is increased further and further. The previous expressions can be rearranged to give each dimension ratio in terms of the other ratio and the cell volume, i.e., $$b = \frac{p}{f^{\frac{1}{2}}c^{1/6}} \cdot d^{3/2}V^{1/6} = 0.0304 \; d^{3/2}V^{1/6}$$

$$d = \frac{f^{\frac{1}{2}}c^{1/6}}{p} \cdot \frac{b^{2/3}}{V^{1/6}} = 10.28 \; b^{\frac{2}{3}}V^{-1/9}$$

From experimental observations of the vortex stability, surface turbulence and wall flow, preferably $d = 3.5$ to 4.0 and $b = 0.35$, so that the cell volume would be around 30 cu. ft. If these values were relaxed to $d = 3.25, b = 0.375$, the maximum volume per stirrer would still only be 75–80 cu. ft. Because a ton of slag occupies roughly 9 cu. ft., the range of capacity per stirrer is roughly from 3 to 9 tons. This means that a pilot furnace of 10 tons with two stirrers is well within the design limits.

EXAMPLE 1

Blade Design for a 10 Ton Pilot Plant

With furnace dimensions such that the shape of the liquid bath is 8 feet × 4 feet × 3 feet, the cell ratio, $c$, is 3/4, and $V = (8 \times 4 \times 3)/2 = 48$ cu. ft.

The stirrer characteristics for typical values of W/D are then calculated as

| W/D = 4 | D = 12" | B = 16.3" | N = 130 RPM |
| W/D = 3.75 | D = 12.8" | B = 14.8" | N = 126 RPM |
| W/D = 3.5 | D = 13.7" | B = 13.3" | N = 122 RPM |

It should be noted that if the ratio B/H is restricted to a value of 0.4, i.e., $B = 14.4$ inches, then the pumping capacities of blades with the above diameters would be 88, 97 and 100 respectively of the design rate.

It was desired to reduce magnetite-containing slag by agitating it with coal as a reductant. The capacity of the furnace was 10 tons of slag, or roughly 96 cu. ft. The preferred values for $b$ and $d$ would lead to a cell volume of about 30 cu. ft., so it was decided to use two agitators. The layout was 8 feet × 4 feet × 3 feet (i.e., two cells side by side, 4 feet square and 3 feet deep, or $c = 0.75$). Using a blade diameter of 12 inches (i.e., W/D = 4) and the values $p = 3.7$ and $f = 204{,}000$ determined from an analogous model system, the blade dimensions and speed were then calculated to be:

D = 12 inches   B = 16.3 inches   N = 130 RPM

Since the value of B/H exceeded 0.4, (the preferable value, as stated above) the blade breadth was reduced to 14.4 inches, i.e., $b = 0.4$, which would give a speed of $N = 147$ RPM for an equivalent pumping capacity for the smaller (i.e., 14.4 inches) blade.

In trials on this furnace, rapid reduction rates of the magnetite in copper smelting slags were achieved at 150

RPM, demonstrating that these agitators were able to substantially increase the effective area of contact between the coal and slag over that which would result from a layer of coal or coke floating on the surface. These results were obtained without any evidence of gas entrainment in the slag bath and with minimal erosion of the refractory walls of the kind that inevitably occurs in conventional electric furnaces.

EXAMPLE 2

Blade Design for 100 Ton Furnace a. Reactor Section

If 4 two bladed stirrers are used for 40 tons of slag with a slag depth, H, of 41 inches, the volume per cell is $(40 \times 9)/4$ or 90 cu. ft. Assuming a cell ratio of 2/3, the stirrer characteristics would be

| | | | |
|---|---|---|---|
| W/D = 3.5 | D = 17.6" | B = 17.6" | N = 108 RPM |
| W/D = 3.25 | D = 18.95" | B = 15.45" | N = 104 RPM |

The respective breadth/liquid depth ratios would be 0.42 and 0.37 respectively, which shows that this cell volume is at the upper limit if the optimum design criteria are to be observed. The reduction of the reactor capacity to 30 tons would allow a W/D ratio of 3.5 to be used while keeping $b = 0.40$.

b. Phase Separation Section

If we assume that the slag depth is the same as in the reactor section, i.e., 41 inches, then the surface area of the bath would be 105 sq. ft. For two stirrers this would be a rectangle of 14.5 feet $\times$ 7.25 feet. In order to prevent entrainment during the settling period, let the upper limit of the vortex strength be set at $N^2D = 150,000$. If we further restrict $b$ to 0.35, then $B = 0.35 \times 41 = 14.4$ inches.

| | | | |
|---|---|---|---|
| For W/D = 4 | D = 21.8" | (B = 14.4") | N = 83 RPM |
| For W/D = 4.5 | D = 19.3" | (B = 14.4") | N = 88 RPM |

These phase separation section stirrers would provide 33 and 37% respectively, of the pumping action used in the reactor section, which would be more than adequate to assist in heat dissipation. In practice, the speed might be cut down to further lower the pumping effect, but it probably would be unwise to reduce the stirrer size significantly, if the whole volume is to be sufficiently mixed.

Various other configurations have been considered, some of which involve more blades than two. For such arrangements, an allowance is made for a lower efficiency per blade.

EXAMPLE 3

Blade Design for 60 Ton Furnace

In Line Furnace with Three Stirrers

For 60 tons, each cell will contain $20 \times 8 = 160$ cu. ft.

a) Slag Depth = Cell Width (c=1)

| | | | |
|---|---|---|---|
| For W/D = 3.0 | D = 21.7" | N = 97 RPM | B = 22.4" (2 Blades) 17.2" (3 Blades) |
| For W/D = 3.25 | D = 20.0" | N = 101 RPM | B = 25.2" (2 Blades) 19.4" (3 Blades) |

The furnace dimensions will be 195 inches $\times$ 65 inches $\times$ 65 inches.

b) Slag Depth = ⅔ Cell Width (c = ⅔)

| | | | |
|---|---|---|---|
| For W/D = 3.0 | D = 24.9" | N = 91 RPM | B = 18.3" (2 Blades) 14.1" (3 Blades) |
| For W/D = 3.25 | D = 23.0" | N = 94 RPM | B = 20.6" (2 Blades) 15.8" (3 Blades) |

The furnace dimensions will be 224 inches $\times$ 75 inches $\times$ 50 inches.

In Line Furnace with Two Stirrers

For 60 tons, each cell will contain 240 cu. ft.

a). Slag Depth = Cell Width (c = 1)

| | | | |
|---|---|---|---|
| For W/D = 3.0 | D = 24.9" | N = 91 RPM | B = 27.4" (2 Blades) 21.1" (3 Blades) |
| For W/D = 3.25 | D = 23.0" | N = 94 RPM | B = 39.9" (2 Blades) 32.8" (3 Blades) |

Furnace dimensions will be 148 inches $\times$ 75 inches $\times$ 75 inches.

b) Slag Depth = ⅔ Cell Width (c = ⅔)

| | | | |
|---|---|---|---|
| For W/D = 3.0 | D = 28.5" | N = 85 RPM | B = 22.4" (2 Blades) 17.2" (3 Blades) |
| For W/D = 3.25 | D = 26.3" | N = 88 RPM | B = 25.2" (2 Blades) 19.4" (3 Blades) |

Furnace dimensions will be 171 inches $\times$ 85 inches $\times$ 57 inches.

In summary, according to the present invention it has been determined that to achieve the desired results of efficient entrainment of a light particulate material into a dense liquid without concomitant entrainment of air, and without excessive erosion of the walls of the vessel containing the liquid, the parameters of a mechanical stirrer to be controlled are the strength of the vortex created and the pumping rate. It has also been discovered that these parameters can be effectively controlled to achieve the desired results by maintaining certain limitations on the design of the stirrers; especially, the diameter and the breadth of the stirrer in relation to the volume to be stirred and the rotational rate of the stirrer in relation to the stirrer's diameter.

While particular preferred embodiments of the present invention have been illustrated in the accompanying drawing and described in detail herein, other embodiments are within the scope of the invention and the following claims.

I claim:

1. A process for entraining particulate matter in a high density liquid maintained in a vessel having a volume defined by a square of side W or a circle of diameter 1.13W and by a liquid depth H, comprising the steps of:

providing a rotatable stirrer in said liquid having a fully submerged blade assembly with a diameter, D, which is about 0.1W to 0.4W and with a breadth, B, which is about 0.1H to 0.7H, supplying particulate matter to the surface of said liquid, and rotating said stirrer at a rate of N RPM such that the particulate matter is drawn down through the vortex produced by said rotating stirrer to said rotating submerged blade assembly, is pumped radially outward therefrom by said submerged rotating blade assembly such that the particulate matter is circulated through said liquid whereby a large area of contact between said liquid and particulate matter is produced.

2. The process of claim 1 wherein N is no less than approximately $100/D^{\frac{1}{2}}$, when D is given in inches.

3. The process of claim 1 wherein N is approximately $450/D^{\frac{1}{2}}$ when D is given in inches.

4. A process of claim 1 wherein said high density liquid is a slag in a pyrometallurgical system.

5. The process of claim 4 wherein said blade diameter, D, is from about 0.2W to about 0.3W and said blade breadth, B, is about 0.2H to 0.4H.

6. The process of claim 4 wherein said particulate matter is supplied to the surface of said liquid in a quantity sufficient to at least fully cover the surface of said liquid, thereby enabling the vortex in said liquid produced by said rotating stirrer to be fully fed by said particulate matter.

7. The process of claim 6 wherein said particulate matter is coal or coke.

8. The process of claim 6 wherein said particulate matter is supplied to the surface of said liquid in substantially a steady stream.

9. The process of claim 4 wherein N is approximately $450/D^{\frac{1}{2}}$ where D is given in inches.

10. In a pyrometallurgical system, a stirrer for stirring liquid in vessel defined by side W or a circle of diameter 1.13W, depth of liquid H, and volume $V = HW^2$, said stirrer comprising a shaft projecting downwardly into said liquid, means for rotating said shaft at N RPM, and a blade assembly secured to said shaft for rotation therewith and being immersed in said liquid, said blade assembly having a diameter D and a breadth B, the improvement wherein $$D = \frac{V^{\frac{1}{3}}}{dc^{\frac{1}{3}}},$$

$$B = \frac{pc^{\frac{1}{3}}d^{3/2}V^{\frac{1}{3}}}{mf^{\frac{1}{3}}}, \text{ and}$$

$$N = \frac{f^{\frac{1}{3}}d^{\frac{1}{3}}c^{1/6}}{V^{1/6}},$$

where $d = W/D$, $c = H/W$, $f$ is a parameter specifying the desired vortex strength and is approximately 200,000 when all dimensions are in inches, $p$ is a parameter specifying the pumping rate and is approximately 4 when all dimensions are in inches and $m$ as the efficiency coefficient and is 1.0 for a two bladed stirrer, approximately 1.3 for a three bladed stirrer and approximately 1.5 for a four bladed stirrer.

11. The stirrer of claim 10 wherein said stirrer further includes a baffle plate disposed about said shaft generally perpendicular to the axis of said shaft adjacent the bottom edge of said blade assembly.

12. The stirrer of claim 10 wherein said blade assembly comprises at least two essentially planar blade portions projecting radially from said shaft, each said blade portion having uninterrupted exterior surfaces for contacting said liquid.

13. The stirrer of claim 10 wherein the value of $d$ is in the range of about 2.5 to 10.0 and ratio of B to the depth of said liquid is no more than about 0.7.

14. The process of claim 1 including the step of providing said stirrer with a baffle plate disposed generally perpendicular to a rotation axis of said stirrer adjacent the bottom edge of said submerged blade assembly.

* * * * *